United States Patent [19]

Lycan et al.

[11] Patent Number: 4,485,558
[45] Date of Patent: Dec. 4, 1984

[54] FILLET WELD GAUGE

[75] Inventors: Goodwin A. Lycan, Box 17D, Dunewood Dr., Bridgman, Mich. 49106; Edward J. Neyens, Dubuque, Iowa

[73] Assignee: Goodwin A. Lycanl, Bridgman, Mich.

[21] Appl. No.: 520,293

[22] Filed: Aug. 4, 1983

[51] Int. Cl.³ .............................................. G01B 5/02
[52] U.S. Cl. ................................................. 33/169 D
[58] Field of Search ............. 33/169 D, 169 R, 174 E

[56] References Cited

FOREIGN PATENT DOCUMENTS 626967  3/1936  Fed. Rep. of Germany ... 33/169 D
633512  7/1936  Fed. Rep. of Germany ... 33/169 D
  5134  2/1970  Japan ................................ 33/169 D Primary Examiner—Harry N. Haroian
Attorney, Agent, or Firm—James D. Hall

[57] ABSTRACT

A gauge for measuring the dimensions of a fillet weld. The gauge includes a calibration arm which slides within diagonal slots formed in the gauge body. The arm overlies a scale imprinted upon the gauge body.

3 Claims, 10 Drawing Figures

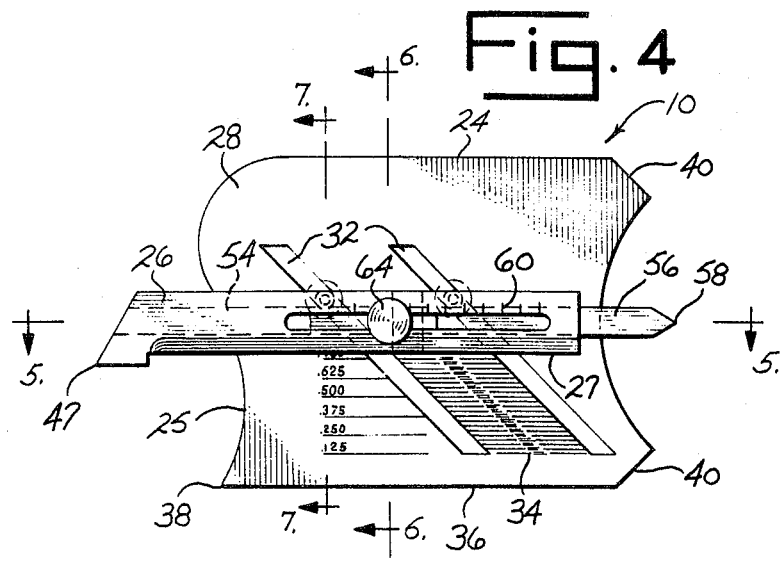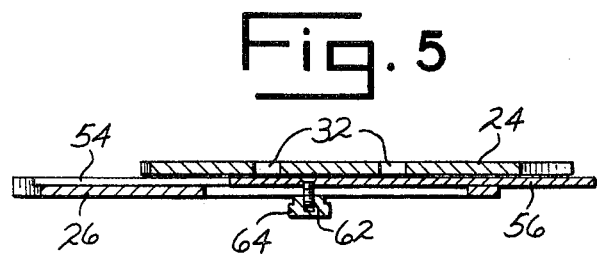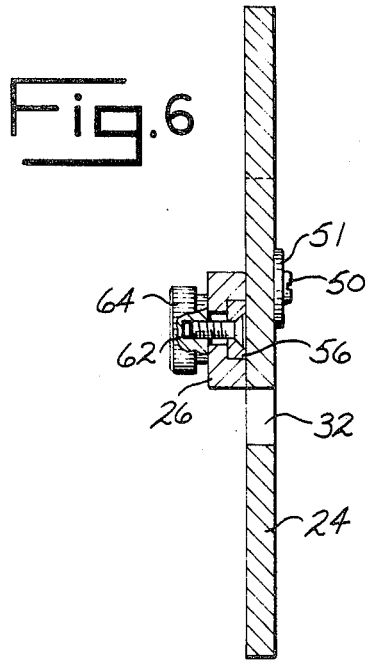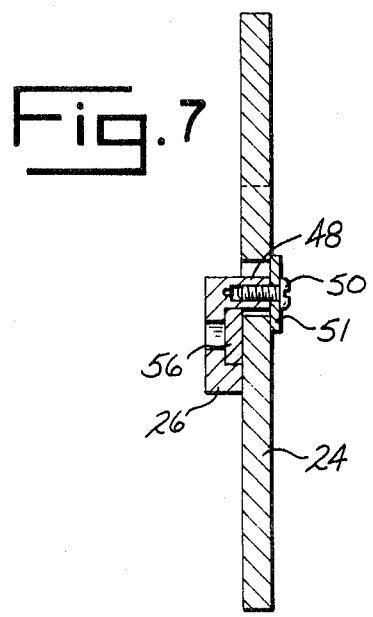

FILLET WELD GAUGE

SUMMARY OF THE INVENTION

This invention relates to an adjustable gauge, and will have special application to the measuring of the dimensions of a fillet weld.

Fillet welds are used when it is desired to join together two metal plates usually located at right angles relative to each other. Heretofore, many of the gauges used to determine the dimensions of these types of welds have not been accurate, and many separate gauges were required to check various sizes of welds. In U.S. Pat. No. 2,389,842, presized corner templates are used to gauge fillet welds. In U.S. Pat. No. 3,597,848, a separate scale member must be utilized to read the gauge.

The gauge of this invention will allow an inspector to check the size of a fillet weld accurately and rapidly, regardless of the specific weld size. The gauge includes two main parts, namely a body member and an arm. The arm slides over the body member and in conjunction with the body member measures the height of the weld. A scale is imprinted on the body member and can be directly read from the position of the arm as the weld is checked.

Accordingly, it is an object of this invention to provide for a novel, adjustable gauge for measuring the dimensions of a fillet weld.

Another object of this invention is to provide for a fillet weld gauge which may be used to rapidly measure many different sizes of welds.

Another object of this invention is to provide for a fillet weld gauge which is readily adjustable and accurate.

Still another object is to provide for a gauge which may measure fillet weld legs which are of unequal length.

Other objects of this invention will become apparent upon a reading of the following description.

BRIEF DESCRIPTION OF THE DRAWINGS

FIG. 4 is a side view of the gauge.

FIG. 5 is a sectional view taken along line 5—5 of FIG. 4.

FIG. 6 is a sectional view taken along line 6—6 of FIG. 4.

FIG. 7 is a sectional view taken along line 7—7 of FIG. 4.

DESCRIPTION OF THE PREFERRED EMBODIMENT

Figure 1:
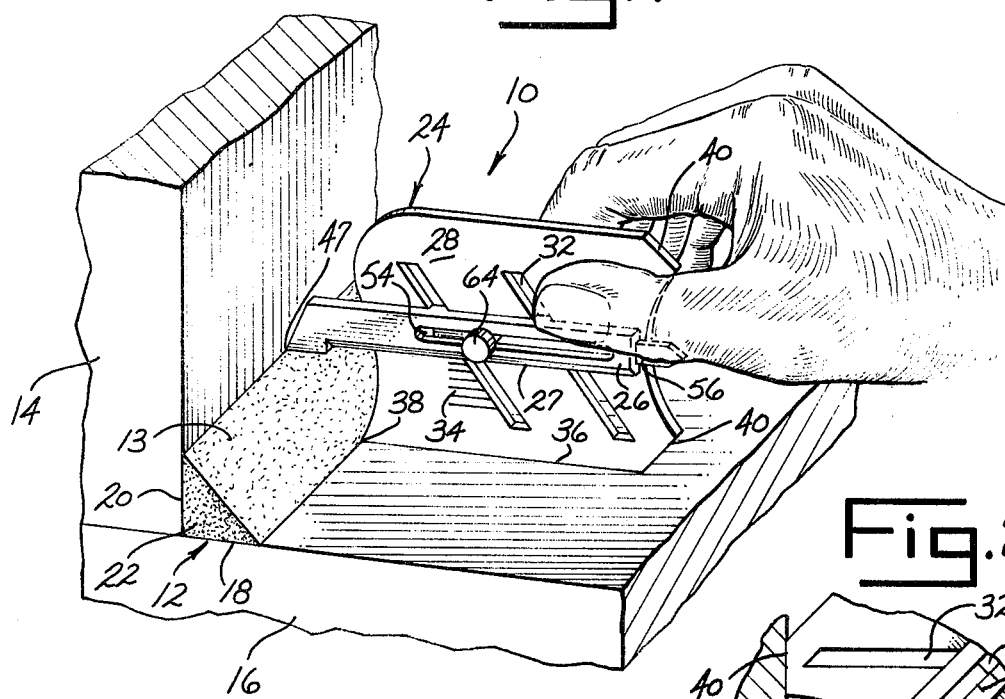
FIG. 1 is a perspective view of the gauge of this invention being used to measure the legs of a fillet weld.

The preferred embodiments herein described are not intended to be exhaustive or to limit the invention to the precise forms disclosed. They are chosen and described to best explain the principles of the invention, and its application and practical use to thereby enable others skilled in the art to utilize the invention.

The gauge 10 shown in FIGS. 1-7 is normally used to measure the dimensions of a fillet weld 12, which joins two structural members 14,16, positioned at right angles to one another. Weld 12 includes two legs 18,20 and a throat 22.

Gauge 10 includes a plate-shaped body member 24 and a calibration arm 26. Body member 24 has side faces 28,30. A pair of parallel diagonal slots 32 are formed through body member 24 and extend from side face 28 to side face 30. A scale 34 is imprinted upon body member side face 28 paralleling the lower edge 36 of body member 24. Body member side edge 25 terminates in a corner 38 with lower edge 36 which allows the gauge to be brought flush against weld leg 18 as seen in FIG. 1. Slots 32 in body member 24 forms a 45° angle with body member lower edge 36.

Calibration arm 26 includes projections 48 which fit slidably within slots 32 of body member 24 to enable the arm to be shifted toward and away from body member edge 36 and thereby vary the spacing between arm tip 47 and body member corner 38. Arm projections 48 are anchored within slots 32 of the body member by fasteners, such as screws 50 and washers 51. A piece of antifriction material (not shown), may be applied to the side face of arm 26 which overlies body member side face 28. This would allow for a greater freedom of sliding movement of arm relative to body member 24.

Arm 26 also includes a channel 54 formed along its inner face. Fitted within channel 54 of the arm is a sliding bar 56 which terminates in a point 58. A scale 60 is imprinted upon arm 26 along a slot 55 formed in the arm in communication with a portion of channel 54. A screw 62 extends from bar 56 and through arm slot 55. A knob 64 is turned upon screw 62. By loosening knob 64, a gauge user may cause the bar 56 to be moved between extended and retracted positions relative to arm 26. Upon the tightening of knob 64, bar 56 is secured in position to arm 26.

To utilize gauge 10 to measure the height and length of weld legs 18,20, one would position gauge corner 38 against the end edge of leg 18. Arm 26 would then be moved upwardly and longitudinally until its tip 47 contacts the end edge of leg 20. The height of weld leg 20 is then read from scale 34 as indicated at the lower edge 27 of arm 26. It should be noted that under this embodiment of the gauge, only fillet welds having legs 18,20 of substantially equal length may be measured accurately.

Figure 8:
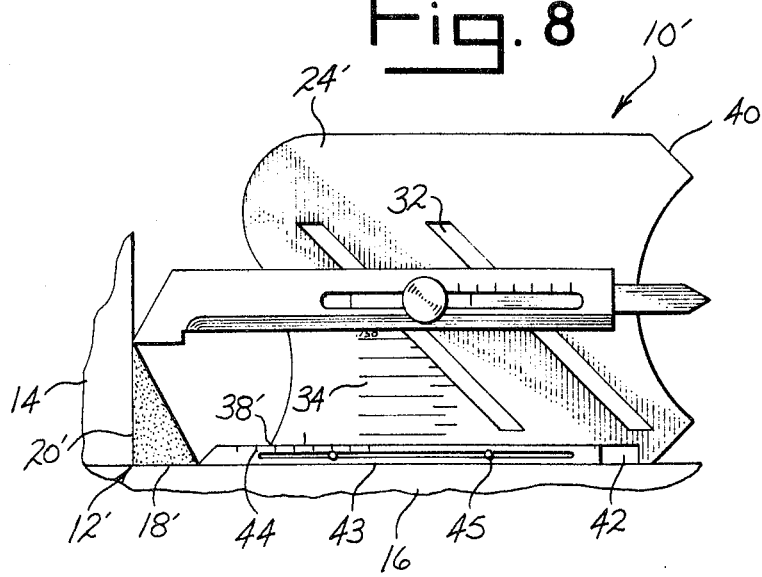
FIG. 8 is a side view of a modified gauge.
Figure 9:
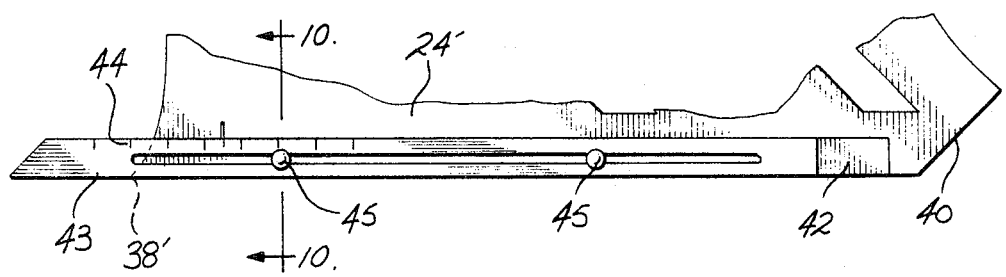
FIG. 9 is an enlarged fragmentary side view of the gauge of FIG. 8 as seen at the bottom.
Figure 10:
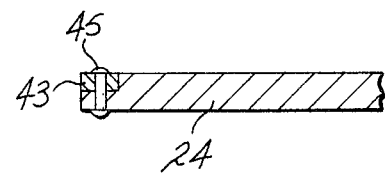
FIG. 10 is a sectional view taken along line 10—10 of FIG. 9.

An alternative embodiment of the gauge is shown in FIGS. 8-10. Modified gauge 10' has a recess 42 formed adjacent the lower edge 36 of gauge body member 24'. A sliding bar 43 is fitted within recess 42 and is secured to body member 24' by pins 45 which extend through a longitudinal slot 47 in bar 43. Bar 43 can be extended to project beyond corner 38' of the body member and a scale 44 is imprinted upon the bar to indicate the distance the bar is extended. Gauge 10' would find use in measuring a fillet weld 12' having substantially unequal legs 18' and 20'. To use gauge 10', one would measure the height or length of the highest or longest weld leg, such as 20', by contact with arm 26' in the manner as described before with gauge 10. Bar 43 would then be slid outwardly into contact with the remaining weld leg, such as 18' and as shown in FIG. 8, with scale 44 being read to indicate the amount of extension of the bar. This reading would then be substracted from the scale 34 reading for the first measured weld leg to arrive at the shorter leg length or height.

Figure 2:
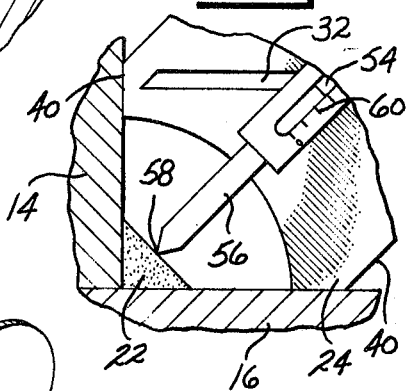
FIG. 2 is an enlarged fragmentary view of the gauge being used to measure the thickness of a fillet weld throat.
Figure 3:
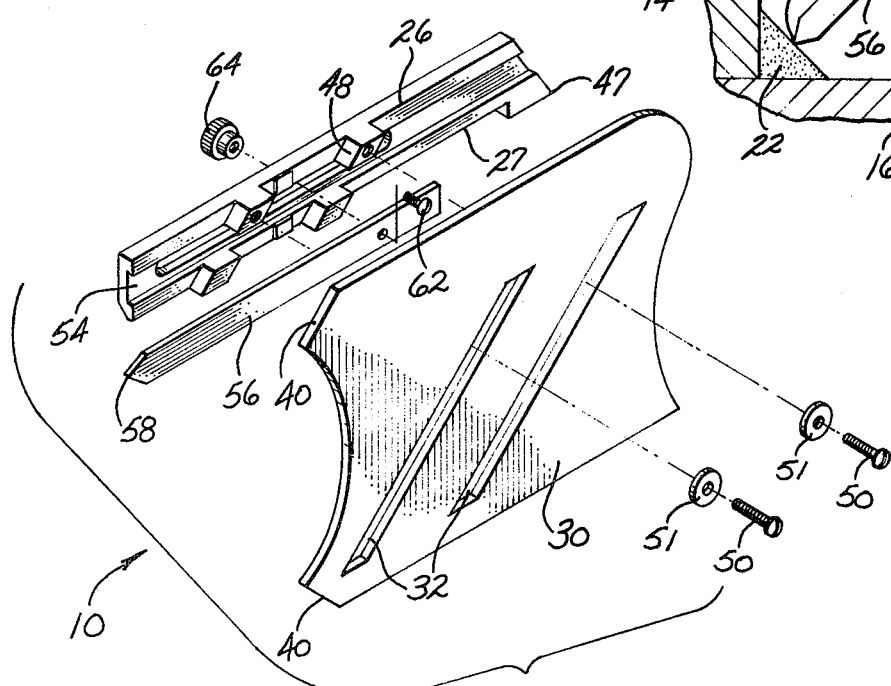
FIG. 3 is an exploded view of the component parts of the gauge.

To utilize gauges 10 or 10' to measure the throat or thickness of a fillet weld, a user fits gauge sides 40 at the opposite end of the gauge against the faces of structural members 14,16. Knob 64 is then loosened, allowing bar member 56 to be extended. Bar 56 is extended until its point 58 contacts the face 13 of weld 12 as seen in FIG. 2. The throat thickness is read from scale 60.

It is to be understood that the scope of this invention is not to be limited to the details given, but may be modified within the scope of the appended claims.

What we claim is:

1. A gauge for measuring the dimensions of a fillet weld joining two structural members, said fillet weld including first and second legs and a throat, said gauge including a body member and an arm, said body member including a face having a scale, a part of said body member being positionable against said weld first leg, an arm positioned upon said body member face, means mounting said arm to said body member for sliding movement of the arm relative to said body member part over said scale and against said weld second leg wherein the resulting reading upon said scale of the position of the arm is indicative of the dimensions of said weld, said means for mounting said arm to said gauge body member including a slot extending through said face, said arm including parts slidably fitted within said slot, the improvement wherein said arm includes an interior channel, a bar slidably fitted within said channel, said bar capable of achieving extended and retracted positions, a scale imprinted upon said bar, said body member including corners positionable against said structural members, said bar contacting said weld throat when said corners are positioned against said structural members and said bar is in its said extended position, wherein the resulting reading from said bar scale is indicative of the thickness of said weld throat.

2. A gauge for measuring the dimensions of a fillet weld joining two structural members, said fillet weld including first and second legs and a throat, said gauge including a body member and an arm, said body member including a face having a scale and an edge, a part of said body member being positionable against said weld first leg, an arm positioned upon said body member face, means mounting said arm to said body member for sliding movement of the arm relative to said body member part over said scale and against said weld second leg wherein the resulting reading upon said scale of the position of the arm is indicative of the length of said weld second leg, said means for mounting said arm to said gauge body member including a slot extending through said face, said arm including parts slidably fitted within said slot, the improvement wherein said body member includes a recess located adjacent said body member edge, said body member part including a bar means slidably fitted within said recess, a scale imprinted upon said bar means, said bar means slidable into an extended position in contact with said weld first leg with said arm against said weld second leg wherein the resulting reading of said bar means scale is indicative of the difference in length of the weld first leg relative to the length of said weld second leg.

3. The gauge of claim 2 wherein said body member is exposed for contact with said weld first leg when said bar means is in a retracted position.

* * * * *